US012682127B2

(12) United States Patent (10) Patent No.: US 12,682,127 B2
Hernes et al. (45) Date of Patent: Jul. 14, 2026

(54) DEBUG-PORT CONTROL CIRCUITRY

(71) Applicant: Nordic Semiconductor ASA,
Trondheim (NO)

(72) Inventors: Bjørnar Hernes, Trondheim (NO);
Berend Dekens, Trondheim (NO);
Håkon Prestegård, Trondheim (NO);
Hannu Koivuranta, Oulu (FI)

(73) Assignee: Nordic Semiconductor ASA,
Trondheim (NO)

( * ) Notice: Subject to any disclaimer, the term of this
patent is extended or adjusted under 35
U.S.C. 154(b) by 107 days.

(21) Appl. No.: 18/687,225

(22) PCT Filed: Aug. 22, 2022

(86) PCT No.: PCT/EP2022/073327
§ 371 (c)(1),
(2) Date: Feb. 27, 2024

(87) PCT Pub. No.: WO2023/030947
PCT Pub. Date: Mar. 9, 2023

(65) Prior Publication Data
US 2025/0077715 A1 Mar. 6, 2025

(30) Foreign Application Priority Data

Aug. 31, 2021 (GB) ..................................... 2112412

(51) Int. Cl.
*G06F 21/75* (2013.01)
*G06F 21/57* (2013.01)

(52) U.S. Cl.
CPC ............ *G06F 21/75* (2013.01); *G06F 21/575*
(2013.01)

(58) Field of Classification Search
CPC ...... G06F 21/572; G06F 21/575; G06F 21/75;
G06F 21/554; G06F 21/755; G06F 21/14;
(Continued)

(56) References Cited

U.S. PATENT DOCUMENTS 6,160,734 A * 12/2000 Henderson ............. G11C 16/22
712/E9.035
7,117,352 B1 * 10/2006 Giles ................ G01R 31/31719
713/2
(Continued)

FOREIGN PATENT DOCUMENTS

CN 105677586 A * 6/2016 ......... G06F 12/1466
CN 116341432 A * 6/2023 ......... G06F 30/3308
(Continued)

OTHER PUBLICATIONS

Costlow, Erik. "Hardware Attack Exposes nRF52 Debugger", Jul.
2020. Retrieved from <https://www.infoq.com/news/2020/07/nRF52-
debug-resurrect>. (Year: 2020).*
(Continued)

*Primary Examiner* — Michael Simitoski
(74) *Attorney, Agent, or Firm* — Klarquist Sparkman,
LLP

(57) ABSTRACT

An integrated-circuit device comprising a non-volatile
memory (NVM), a debug port, and debug-port control
circuitry for controlling access to the integrated-circuit
device through the debug port. The debug-port control
circuitry is configured to read a first bit array and a second
bit array from respective predetermined locations in the
NVM in a single read cycle. The second bit array is distinct
from the first bit array, and at least the second bit array
contains a plurality of bits. The debug-port control circuitry
is further configured to determine whether the first bit array
has a first predetermined bit pattern and whether the second
bit array has a pattern other than a second predetermined bit
pattern, and to control access through the debug port at least
partly in dependence on said determination.

20 Claims, 5 Drawing Sheets

(58) Field of Classification Search
CPC .......... G06F 21/64; G06F 21/52; G06F 21/55; G06F 21/54; G06F 11/0751; G06F 11/27; G06F 12/14; G01R 31/31719; G01R 31/318588; G11C 7/24; G11C 16/22; G11C 11/4125; H04L 9/004
See application file for complete search history.

(56) References Cited

U.S. PATENT DOCUMENTS

| | | | | |
|---|---|---|---|---|
| 7,254,720 | B1 * | 8/2007 | Giles ........................ | G06F 21/74 726/22 |
| 9,021,316 | B2 * | 4/2015 | Bancel ...................... | G11C 7/24 711/155 |
| 9,355,276 | B2 * | 5/2016 | Laine ...................... | G06F 21/572 |
| 12,265,613 | B2 * | 4/2025 | Ghetie .................... | G06F 21/75 |
| 2003/0204696 | A1 * | 10/2003 | Yi ........................... | G06F 21/75 711/167 |
| 2008/0016395 | A1 * | 1/2008 | Feng ........................ | G06F 21/85 714/27 |
| 2009/0073759 | A1 * | 3/2009 | Wuidart ................. | G11C 16/22 365/210.1 |
| 2013/0275817 | A1 * | 10/2013 | Bancel ...................... | G11C 7/24 714/54 |
| 2016/0098333 | A1 * | 4/2016 | Hershman ............... | G06F 21/75 714/41 |
| 2017/0089477 | A1 * | 3/2017 | Svensson ................. | F16K 3/02 |
| 2017/0139008 | A1 * | 5/2017 | Lim ................... | G01R 31/3177 |
| 2018/0075888 | A1 * | 3/2018 | Le Roy .................... | G09C 1/00 |
| 2018/0189496 | A1 * | 7/2018 | Wu ......................... | G06F 21/575 |
| 2018/0241568 | A1 * | 8/2018 | Schilder .................. | G06F 21/73 |
| 2018/0349600 | A1 * | 12/2018 | Elenes .................. | G06F 21/725 |
| 2019/0163909 | A1 * | 5/2019 | Schilder ................ | H04L 9/0822 |
| 2019/0325141 | A1 * | 10/2019 | Liew ..................... | G06F 21/575 |
| 2020/0210587 | A1 * | 7/2020 | Shi .......................... | G11C 29/24 |
| 2020/0402602 | A1 * | 12/2020 | Mahatme ............. | G11C 29/021 |
| 2021/0256164 | A1 * | 8/2021 | Loisel ................... | H04L 9/0819 |
| 2023/0129830 | A1 * | 4/2023 | Ghetie .................... | G06F 21/74 726/23 |
| 2023/0334149 | A1 * | 10/2023 | Nashimoto ............. | G06F 21/79 |
| 2024/0160545 | A1 * | 5/2024 | Srivastava .............. | G06F 12/14 |
| 2024/0211603 | A1 * | 6/2024 | Liu ........................ | G06F 21/575 |

FOREIGN PATENT DOCUMENTS

| | | | | |
|---|---|---|---|---|
| EP | | 2602952 | A1 * | 6/2013 ........... G06F 21/755 |
| EP | | 3 543 881 | | 9/2019 |
| WO | WO 2017/072500 | A1 | | 5/2017 |
| WO | WO 2018/104711 | A1 | | 6/2018 |
| WO | WO 2020/002441 | A1 | | 1/2020 |

OTHER PUBLICATIONS

LimitedResults. "nRF52 Debug Resurrection (Approtect Bypass) Part 1", Jun. 2020. Retrieved from <https://limitedresults.com/2020/06/nrf52-debug-resurrection-approtect-bypass/>. (Year: 2020).*

B. Yuce, C. Deshpande, M. Ghodrati, A. Bendre, L. Nazhandali and P. Schaumont, "A Secure Exception Mode for Fault-Attack-Resistant Processing," in IEEE Transactions on Dependable and Secure Computing, vol. 16, No. 3, pp. 388-401, May 1-Jun. 2019, doi: 10.1109/TDSC.2018.2823767. (Year: 2019).*

NCCGroup. "Software-Based Fault Injection Countermeasures (Part 2/3)", Jul. 8, 2021. Retreived from <https://www.nccgroup.com/us/research-blog/software-based-fault-injection-countermeasures-part-23>. (Year: 2021).*

B. Yuce, et al. "FAME: Fault-attack Aware Microprocessor Extensions for Hardware Fault Detection and Software Fault Response" ( 2016). (Year: 2016).*

Wang, Qian-zhi. CN 105677586 A (machine translation), published Jun. 15, 2016. (Year: 2016).*

Ning, Jia-hao et al. CN 116341432 A (machine translation), published Jun. 27, 2023. (Year: 2023).*

International Search Report and Written Opinion for PCT/EP2022/073327, mailed Nov. 28, 2022, 14 pages.

IPO, Combined Search and Examination Report under Sections 17 and 18(3) for Great Britain Application No. 2112412.8, dated Feb. 2, 2022, 6 pages.

Limaye et al., "AntiDOTE: Protecting Debug Against Outsourced Test Entities," *IEEE Transactions on Emerging Topics in Computing*, vol. 10, Issue 3, Aug. 2021, pp. 1507-1518.

Wiersma et al., "Safety !=Security, On the resilience of ASIL-D certified microcontrollers against fault injection attacks," *2017 Workshop on Fault Diagnosis and Tolerance in Cryptography*, Sep. 2017, pp. 9-16.

* cited by examiner

DEBUG-PORT CONTROL CIRCUITRY

CROSS REFERENCE TO RELATED APPLICATIONS

This is the U.S. National Stage of International Application No. PCT/EP2022/073327, filed Aug. 22, 2022, which was published in English under PCT Article 21 (2), which in turn claims the benefit of Great Britain Application No. 2112412.8, filed Aug. 31, 2021.

BACKGROUND OF THE INVENTION

This invention relates to debug-port control circuitry for integrated-circuit devices.

A system-on-chip (SoC) contains one or more processors and memory for storing software to be executed by the chip. Some boot code may be permanently stored in ROM, but most of the software (e.g. firmware) is typically written to non-volatile memory (NVM) after the chip has been fabricated and packaged. The NVM might include one-time programmable (OTP) memory, CMOS-based multi-time programmable (MTP) memory, embedded flash, or a combination of these. Firmware is typically loaded to the NVM through a debug port of the SoC.

In order to improve the security of the SoC, it can be desirable to prevent unauthorised parties from accidentally or maliciously reading data from, or loading executable code to, the NVM. This may be accomplished by closing (i.e. disabling) the debug port to external access, e.g. after initial firmware has been loaded to the NVM as part of a production process. The debug port could be irreversibly closed (e.g. by blowing an eFuse or by setting a flag in OTP), or it could be reversibly closed (e.g. by setting a flag in MTP or flash that can only be reset when certain security conditions are met, such as only if the entire memory of the SoC is first erased, to bring the SoC back to a factory state). Hardware logic circuitry may be provided that reads such a flag upon every reset of the SoC and that opens the debug port only if the closed flag has not been set.

However, a malicious attacker might attempt to trick such an SoC into opening the debug port, when it would otherwise be closed, by launching a fault-injection attack, such as laser fault injection (LFI) or power-supply glitching, in order to cause the flag to be misread by the control logic. If the logic wrongly identifies the closed flag as not set, when it has actually been set, the debug port may then be opened for the attacker.

Embodiments of the present invention seek to provide an improved approach to controlling access to a debug port.

SUMMARY OF THE INVENTION

From a first aspect, the invention provides an integrated-circuit device comprising:

a non-volatile memory (NVM);

a debug port; and debug-port control circuitry for controlling access to the integrated-circuit device through the debug port, wherein the debug-port control circuitry is configured to:

read a first bit array and a second bit array from respective predetermined locations in the NVM in a single read cycle, wherein the second bit array is distinct from the first bit array, and wherein at least the second bit array contains a plurality of bits;

determine whether i) the first bit array has a first predetermined bit pattern and ii) the second bit array has a pattern other than a second predetermined bit pattern; and control access through the debug port at least partly in dependence on said determination.

Thus it will be seen that, in accordance with embodiments of the invention, access through the debug port is controlled not by a single bit flag, but according to whether a first bit array (of one or more bits) has a particular pattern while a second bit array (of two or more bits) doesn't have a particular pattern. In order for an attacker to trick the debug-port control circuitry into making a false determination—and so potentially inappropriately granting (or denying) access through the debug port—the attacker would have to cause the second bit array to be misread, while not causing even a single bit of the first bit array to be misread. Fault injection attacks typically introduce random errors across all the bits that are read in a single read cycle, rather than being able to target just a single bit or subset of bits, and so there is a low likelihood of such an attacker successfully tricking the debug-port control circuitry.

In some embodiments, the debug port may this be initially opened (e.g. by a chip manufacturer) by using a test probe to set the first bit array equal to the first predetermined bit pattern, while not setting the second bit array at all (e.g. leaving it in a default state, which may be all binary ones, or random values, depending on the memory technology of the NVM). Once the device has been programmed through the debug port (e.g. by a system integrator), the debug port may be closed by setting the second bit array equal to the second predetermined bit pattern (e.g. by writing to the NVM through the debug port).

The likelihood of a successful attack to re-open the debug port is then low. This likelihood may be further reduced by using longer first and/or second bit arrays. Thus, in preferred embodiments, the first bit array contains a plurality of bits. The first and second bit arrays may each be at least 16 or 32 bits long.

The first and second bit arrays may have the same length (e.g. both being 32 bits long). They may have a combined bit-length that is equal to a maximum number of bits that the NVM is configured (i.e. is able) to read in a single read cycle. This may optimise the security level that can be achieved by each read cycle. The NVM may be arranged in a number of columns, which may be equal to the combined bit-length of the first and second bit arrays. The NVM may have a number of sense amplifiers exactly equal to the combined bit-length.

One or both bit arrays could be non-contiguous, e.g. with the bits of the first and second bit arrays being stored at interleaved locations across a set of columns of the NVM. This may increase the robustness against fault-injection attacks applied to the NVM. However, in other embodiments, each bit array is stored as a respective contiguous string of bits. This may simplify the implementation of the debug-port control circuitry.

One or both predetermined bit patterns may contain an equal number of one bits and zero bits (i.e. have a Hamming weight equal to half the length of the pattern). This may help to mitigate against fault-injection attacks that are more likely to cause bits to flip in one direction (e.g. from one to zero), than in the opposite direction.

The first and second predetermined bit patterns may be the same pattern (i.e. a single pattern). This may simplify the implementation of the control circuitry.

The NVM may be OTP memory, or it may be erasable—e.g. being MTP or flash memory. The integrated-circuit (IC) device may comprise one or more further non-volatile memories, such as a system NVM, which may be of the same or a different memory technology to the NVM that stores the bit patterns. The device may comprise a processor for executing software stored on the device (e.g. stored in NVM or RAM).

The debug-port control circuitry is preferably configured to read the bit arrays and to make said determination in response to the device being booted and within a boot process of the device—e.g. after each device reset. It may be configured to make said determination before any processor on the device starts executing software instructions.

The debug-port control circuitry may be configured to open the debug port only when said determination is true (i.e. as a necessary condition). The device may be configured to maintain the debug port closed otherwise (i.e. by default). In some embodiments, this determination may also be a sufficient condition for the control circuitry to open the port. However, in other embodiments, the debug-port control circuitry may be configured to open the debug port only if one or more further conditions are also met.

The debug-port control circuitry is preferably implemented as a hardware finite state machine—e.g. comprising dedicated logic gates. It preferably does not comprise a general-purpose processor, nor execute software instructions. This allows it to operate faster and be more resistant to fault injection attacks.

The locations of the bit arrays and/or the predetermined patterns are preferably hardwired in the control circuitry (rather than, for instance, being read from the NVM). This can reduce the threat of attacks that seek to manipulate these values.

The debug-port control circuitry is preferably configured to determine, in a single clock cycle, both whether the first bit array has the first predetermined bit pattern and whether the second bit array has a pattern other than the second predetermined bit pattern (but is not necessarily configured to determine, in the same clock cycle, whether their logical conjunction is true). This can increase resilience against fault-injection attacks directed at the control circuitry.

The debug-port control circuitry is preferably configured to take a predetermined constant number of clock cycles to determine how to control the debug port (e.g. whether or not to open the debug port), irrespective of what patterns the debug-port control circuitry receives when reading the first and second bit arrays from the NVM. This may prevent an attacker acquiring information for mounting an attack through supply-current profile analysis.

The debug-port control circuitry may be configured to determine whether to open the debug port only in dependence on the values of the one pair of first and second bit arrays.

However, in some embodiments, the debug-port control circuitry is configured to read a plurality of pairs (i.e. comprising one or more further pairs) of first and second bit arrays from respective predetermined locations in the NVM, each pair being read in a respective single read cycle. One or both bit arrays of each pair preferably contains a plurality of bits. The debug-port control circuitry may be configured, for each pair, to determine whether i) the first bit array of the pair has a respective first predetermined bit pattern and ii) the second bit array of the pair does not have a respective second predetermined bit pattern, and to control access through the debug port at least partly in dependence on the determinations made in respect of each pair.

The respective first and second predetermined patterns may all be the same pattern, which may be the aforesaid single pattern. This may simplify the implementation. The debug-port control circuitry may be configured to use the same logic for determining whether the bit array of each pair has the respective predetermined bit pattern—e.g. within an iterative process.

The debug-port control circuitry may be configured to open the debug port only when the first bit array of every pair has the respective first predetermined bit pattern and the second bit array of every pair has a pattern other than (i.e. not equal to) the respective second predetermined bit pattern. Thus, if even one of the second bit arrays has the respective second predetermined bit pattern, or if even one of the first bit arrays does not have the respective first predetermined bit pattern, the debug port will remain closed. Thus, the debug port can be closed by setting all of the first and second bit arrays to their respective predetermined patterns, after which an attacker could only re-open it by tricking the control circuitry into misreading every one of the second bit arrays, while not misreading even a single bit of any of the first bit arrays. The likelihood of achieving this decreases as the number of pairs increases. In some embodiments, the NVM may thus be sized to store at least 2, 16, 32 or more pairs.

For at least two pairs of bit arrays, the locations may be such that the first bit array of a first pair is read over a first set of read lines and/or using a first set of sense amplifiers, the second bit array of the first pair is read over a second set of read lines and/or using a second set of sense amplifiers (different from the first set), the first bit array of the second pair is read over said second set of read lines and/or using said second set of sense amplifiers, and the second bit array is read over said first set of read lines and/or using said first set of sense amplifiers. This may further mitigate against fault injection attacks directed at the NVM, by ensuring that an attack that causes a particular read line or sense amplifier to misread consistently over multiple read cycles will be detected.

The debug-port control circuitry may be configured to finish reading all the pairs from the NVM (i.e. to complete all the single read cycles) before determining whether to open the debug port.

However, the debug-port control circuitry may be configured to read a pair and determine whether the first bit array of the pair has the respective first bit pattern, before reading a next pair. It may do this successively for each pair. It may store a result of each determination in a first counter (e.g. by incrementing an internal counter when the first bit array does have the first bit pattern), before reading the next pair. It may additionally or alternatively store the result by setting a respective bit (corresponding to the pair) of a first bit field to a first predetermined value. Such use of a multi-bit field, which may be as long as the number of pairs, rather than a single bit, may help mitigate fault attacks directed at the control logic. Preferred embodiments may store the result in both a counter and a bit field; such redundant storage may nevertheless provide increased resilience against fault attacks directed at the control logic.

The control circuitry may be configured to read a pair and determine whether the second bit array of the pair has the respective second bit pattern, before reading a next pair. It may do this successively for each pair. It may store a result of each determination in a second counter (e.g. by incrementing the counter when the second bit array does have the second bit pattern) and/or by setting a respective bit (corresponding to the pair) of a second bit field to a second predetermined value. The second predetermined value may be different from the first predetermined value—e.g. such that the first bit field must equal all 1's and the second bit field must equal all 0's, after all pairs have been evaluated, before the debug port can be opened. By using different values, an attack that forced both bit fields to equal all 1's or to equal all 0's would fail to open the debug port.

The control circuitry may comprise logic that uses the values of the counter(s) and/or bit fields, after all of the pairs have been read from the NVM, to determine whether to open the debug port.

The control circuitry may be configured to initialise the first or second counter to a respective starting value that is such that a final value of the counter necessary for the control circuitry to open the debug port has an equal number of one bits and zero bits. This can make it harder to attack the control logic with an attack that biases the counter towards being all 0's or all 1's.

The IC device may be a semiconductor device such as a system on chip (SoC).

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
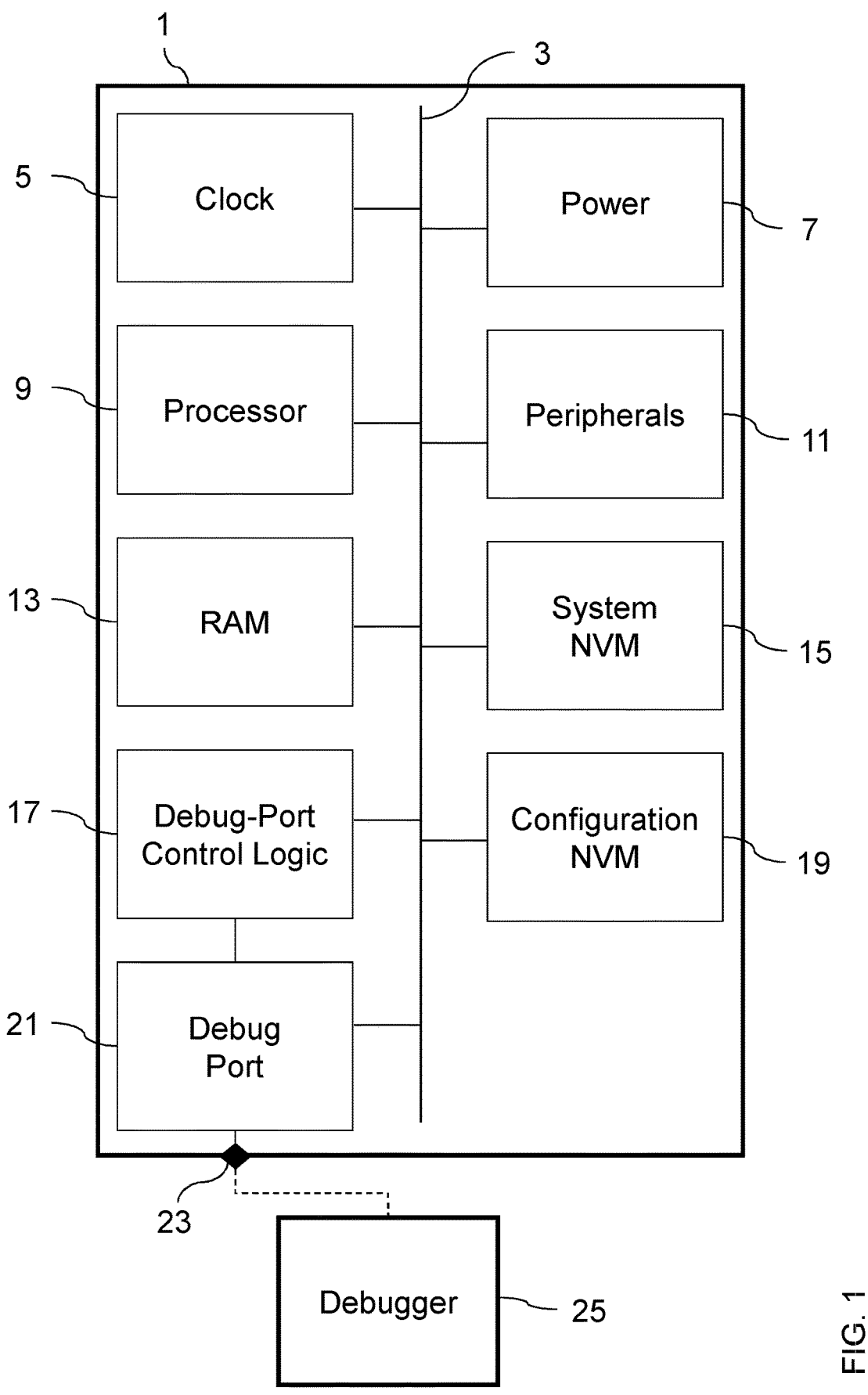
FIG. 1 is a schematic diagram of a system on chip (SoC), embodying the invention, which is here shown coupled to an external debugger.

FIG. 1 shows an integrated-circuit (IC) system on chip (SoC) 1 which comprises a bus system 3 that is coupled to clock logic 5 (which may include a resistor-capacitor oscillator and/or may receive an input from an off-chip crystal oscillator), power management circuitry 7, a processor 9 (e.g. an ARM™ Cortex-M processor), one or more peripherals 11 (which may include timers, converters, a digital radio, etc.), RAM 13, system non-volatile memory (NVM) 15, debug-port control logic 17 (a hardware finite state machine), configuration NVM 19, and a debug port 21.

The debug port 21 may implement an ARM™ Core-Sight™ Debug Access Port (DAP). It provides a debug interface 23, comprising one or more pins or pads, to which an external debugger 25 may be coupled. The debug interface 23 may, for instance, support connections from a Serial-Wire-Debug (SWD) debugger and/or a Joint Action Test Group (JTAG) debugger, e.g. in accordance with an IEEE 1149.1 standard.

The debug port 21 may be used for loading software and data into the system NVM 15, as well as for sending debug instructions to the processor 9, and receiving trace and debug information from the SoC 1. Such operations may be carried out by the chip manufacturer and also by a customer, such as an integrator who integrates the SoC 1 into a larger device and may develop application software for execution by the SoC 1. However, the debug port 21 would typically be completely disabled before the SoC 1 is shipped to a final end user (e.g. once the SoC 1 has been integrated into a more complex product).

In use, the SoC 1 may be connected to a number of external components such as a power supply, radio antenna, crystal oscillator, sensors, output devices, etc.

Memory protection circuitry in the SoC 1 may control access to the system NVM 15 and configuration NVM 19. The debug port 21 may be granted privileged access to NVM 15, 19 and RAM 13, that could allow an attacker to steal code or data, or tamper with the SoC 1 in other ways, if the debug port 21 is left open after final shipping of the SoC 1. Thus the debug-port control logic 17 acts to control whether the debug port 21 is open or closed, as described in more detail below.

The system NVM 15 may be flash or CMOS-based multi-time programmable (MTP) memory, or any other type of non-volatile memory. It may have protected and unprotected memory regions. A protected region may be used to store a bootloader and manufacturer firmware code and data. An unprotected region may store customer software.

The configuration NVM 19 may be flash, MTP memory, or one-time programmable (OTP) memory, or any other type of non-volatile memory. In some embodiments, it is CMOS MTP memory. It provides a set of configuration registers for storing configuration settings for various components of the SoC 1, such as certain peripherals 11, the processor 9, memory protection logic, etc. It can also store data for use by the debug-port control logic 17. It may be written to from outside the chip 1, through the debug port 21, e.g. as part of a manufacturing or integration process.

The system NVM 15 and configuration NVM 19 may be respective parts of a common memory (e.g. being respective parts of a single flash memory region), or they may be separate, e.g. having different read and write circuitry, and potentially being different respective types of memory.

Access to the debug port 21 is controlled by the debug-port control logic 17 in dependence on a set of "APPRO-TECT" ("Access Port Protect") words stored at respective predetermined addresses in the configuration NVM 19. The control logic 17 and configuration NVM 19 are robust against fault injection attacks, as described below.

Hostile attacks on electronic devices, such as SoCs, are often performed by obtaining access through a debug port. Therefore, it is of high importance that the debug port is strongly secured.

A hostile attack against the SoC 1 might attempt to manipulate the readout or evaluation of the APPROTECT words so as to trick the debug-port control logic 17 into opening the debug port 23 after it has been closed. The attack could use one or more fault injection methods, such as: power or clock glitch fault injection; light (e.g. laser) fault injection (LFI); electromagnetic fault injection (EMP); body bias fault injection; or other similar approaches. To mitigate such attacks, the reading and evaluating of the APPROTECT words is done in such a way as to make it very difficult for an attacker to break into the SoC 1 through the debug port 21.

The APPROTECT words are read during system boot (e.g. after each system-wide reset of the SoC 1), and the contents of the APPROTECT registers are compared to one or more pre-defined values by the hardwired control logic 17. The debug port 23 is opened or closed depending on the result of this evaluation.

In a first set of embodiments, there are two APPROTECT words, one for opening the debug port and the other one closing it. In a second set of embodiments, there are more than two APPROTECT words.

The same debug-port control logic 17 can advantageously support different kinds of memory technology for the configuration NVM 19. It may, for instance, support all of the following:

OTP memory that is all 1's (i.e. 0xFFFF . . . ) before being written to (i.e. when "fresh from fab"), and in which 1 bits cannot be changed in a word once the word has been programmed OTP memory that is all 1's (i.e. 0xFFFF . . . ) before being written to, and in which 1 bits can be changed in a word even after the word has been programmed OTP memory that has random values before being written to, and in which bits cannot be changed in a word once the word has been programmed MTP memory that has random content before being written to and after being erased, and in which bits cannot be changed in a word once the word has been programmed MTP memory that is all 1's (i.e. 0xFFFF . . . ) before being written to and after being erased, and in which bits cannot be changed in a word once the word has been programmed flash memory, which is all 1's (i.e. 0xFFFF . . . ) before being written to and after being erased.

It may support other memory types, also. The configuration NVM 19 may be of any of these memory types.

Figure 2:
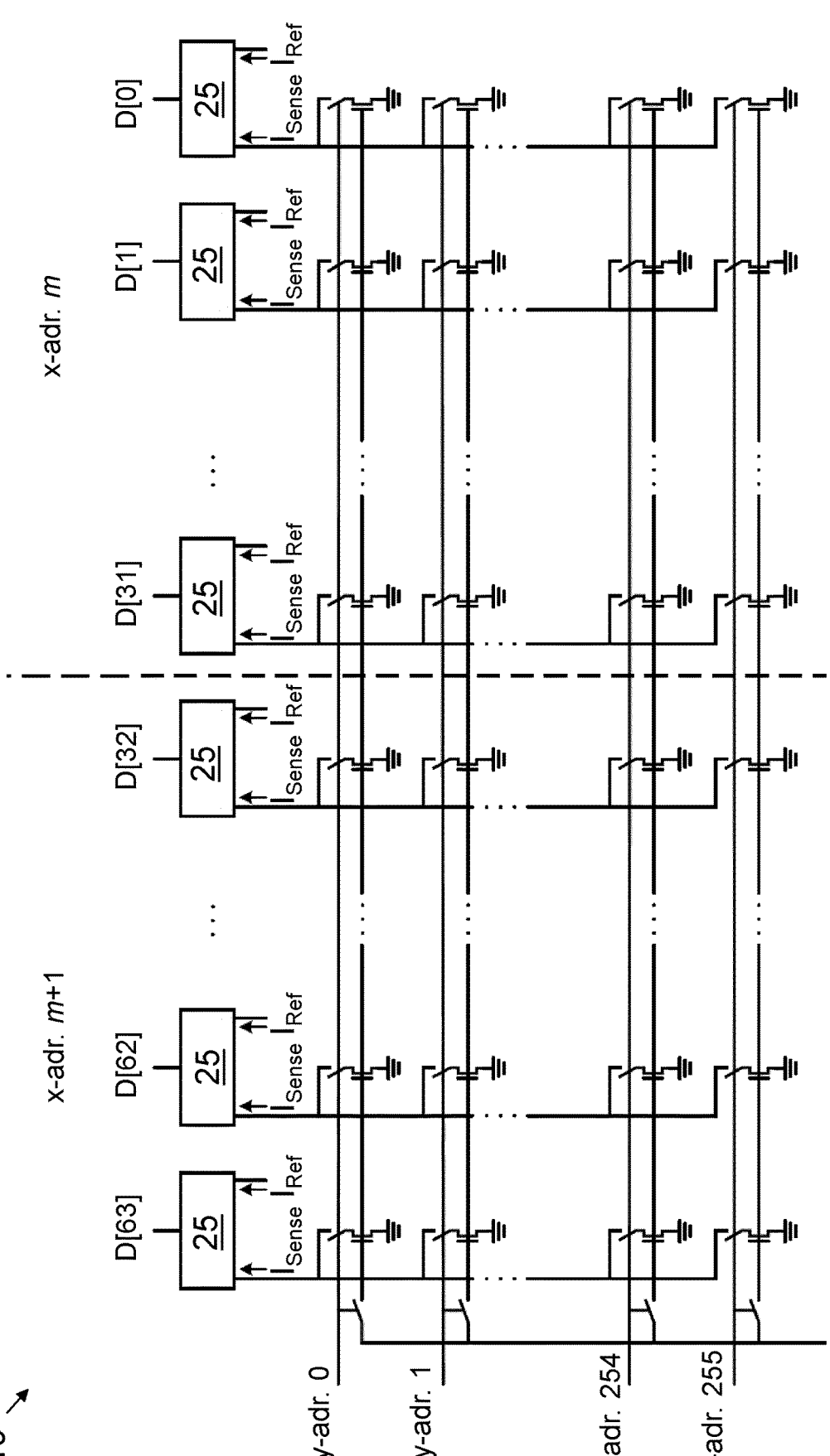
FIG. 2 is a schematic diagram of part of the control circuitry of the configuration non-volatile memory (NVM) of the SoC.

FIG. 2 shows an example implementation of the configuration NVM 19 using CMOS MTP that is all 1's before being written to and after being erased. In this example one memory sector (page) has sixty-four columns and 256 rows, and stores 2,048 Bytes (2 KB), addressable as 256 pairs of 32-bit words. Each column has a respective sense amplifier 25 for sensing the difference between the current, $I_{Sense}$, through the bit transistor, and a common reference current, $I_{Ref}$. A row of bit transistors is selected by a row address, y. When a row address line y is high, all sixty-four bit transistors in the row are connected to the respective sense amplifiers 25, and a line voltage is applied to the bit transistor gates.

The reading sequence is:

x-address and y-address is set; if x-address m is chosen, also address m+1 is read out (and vice versa), since the whole 64-bit word is read out at once the chosen row (set by y-address) activates all 64 bit transistors in this row the bit transistors are connected drain to the column sense amplifiers 25 the word line voltage is applied to the gates of the bit transistors the sense amplifiers 25 are released, to starting evaluation of $I_{Sense}$ and $I_{Ref}$ if $I_{Sense} > I_{Ref}$ then it is determined that D[i]=1 (i.e. the bit transistor is not programmed), else D[i]=0 (i.e. the bit transistor is programmed).

Fault injection attacks may seek to exploit effects such as:

offsets in the sense amplifiers 25 mismatch between bit transistor and reference currents mismatch in the timing of different parts of the memory 19 due to different physical distances physical distance in general (e.g. hitting different parts of NVM 19 when using laser end EMP).

The SoC 1 makes the read out of the APPROTECT setting more robust against such fault injection attacks by reading a pair of APPROTECT words at the same read cycle. When using memory configured similarly to that shown in FIG. 2, this involves reading two 32-bits words in a single read cycle. For other memories, the lengths of the APPROTECT registers may have different values.

In a first set of embodiments, the APPROTECT configuration setting consists of two 32-bit registers, APPROTEC0 and APPROTECT1. The debug-port control logic 17 reads these words from the configuration NVM 19 once after each reset of the SoC 1, i.e. during booting of the SoC 1.

In an exemplary implementation, the debug-port control logic 17 is configured to open the debug port 21 when and only when APPROTECT0=0xCAACCAAC and APPROTECT1≠0xCAACCAAC (both conditions to be met). It prevents all external access through the debug port 21 otherwise (i.e. it keeps the port 21 closed).

The value 0xCAACCAAC is hardwired into the circuitry of the debug-port control logic 17. Using the same predetermined value for both APPROTECT0 and APPROTECT1 may simplify the implementation of the control circuitry 17. However, a different value or values could be used in other embodiments.

In an example manufacturing process, at end of probe testing, the debug port 21 is opened by writing the value 0xCAACCAAC to APPROTECT0, while APPROTECT1 is left unprogrammed—i.e. having all 1's or random content, depending on the type of the configuration NVM 19. Because 0xCAACCAAC is a 32-bit number, even if the configuration NVM 19 has random values at manufacturing, the probability of APPROTECT1 happening to equal 0xCAACCAAC by pure chance (such that the debug port 21 is already locked at manufacturing and the device has to be scrapped) is extremely low, at $1/2^{32}$.

Software and data may then be conveniently loaded onto the SoC 1 through the debug port 21, e.g. by a system integrator, after the chip has been packaged.

Later on, before the SoC 1 is supplied to an end user, the debug port 21 is closed (e.g. by the system integrator), by writing 0xCAACCAAC to APPROTECT1 and initiating a subsequent reset of the SoC 1. This write may be performed from outside the SoC 1 through debug port 21.

Once closed in this way, the debug port 21 can only be reopened (e.g. by an attacker) if the control logic 17 is tricked into misreading APPROTECT1 while not even a single bit of APPROTECT0 is disturbed. This is practically difficult to accomplish, due to the fact that both 32-bit words are read in a single read operation. Moreover, the value of 0xCAACCAAC is chosen because it has an equal number of 1's and 0's, making it harder to trick the control logic 17 into correctly receiving this value for APPROTECT0 while inducing an error in the reading of APPROTECT1 using the known fault injection methods, such as power glitching, laser injection, applying EMP to the chip, or body biased fault injection.

If there were no transistor mismatch and noise, and no timing differences between the reading of APPROTECT1 and APPROTECT0, it should be theoretically impossible to change one or more bits of APPROTECT1 without changing any bit of APPROTECT0, e.g. by applying glitches on the power supply or clock.

However, real circuitry will exhibit timing differences in the reading of APPROTECT0 and APPROTECT1. Timing differences may be caused by layout effects, such as parasitic capacitance and resistance, as well as by transistor mismatch and noise. For example, some memories may exhibit mismatch between bit-cell transistors and/or in the sense amplifiers 25. The combined mismatch of the bit-cell transistors and/or the sense amplifiers 25 may be such that it is possible (albeit difficult) to flip one or more bits of APPROTECT1 without any changes to APPROTECT0, e.g. by glitching the power supply.

Moreover, it may be possible (although difficult), using EMP, laser injection or body biasing, to flip bits in APPRO-TECT1 and not in APPROTECT0, due to the difference in physical locations of APPROTECT1 and APPROTECT0—e.g. by applying a laser pulse to an area of the SoC 1 that stores APPROTECT1 but not APPROTECT0.

Thus, in a second set of embodiments, to make it more difficult to reopen the debug port 21 after it has been closed, the control logic 17 reads multiple pairs of APPROTECT words, rather than just a single pair, and only opens the port 21, during boot, when every instance of APPROTECT0=0xCAACCAAC and every instance of APPROTECT10xCAACCAAC (both conditions to be met).

Figure 3:
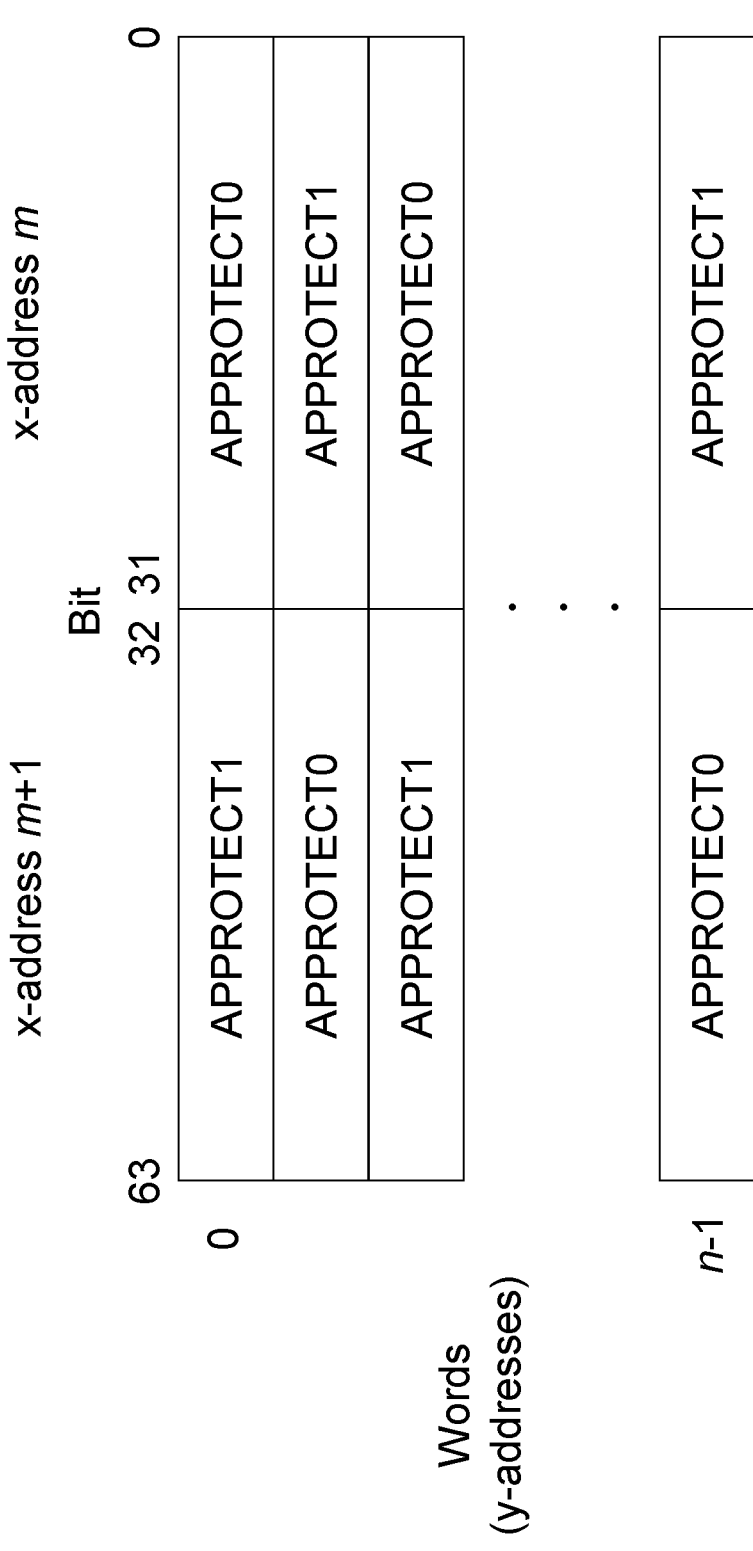
FIG. 3 is a table showing locations for configuration data in the configuration NVM to control access to a debug port of the SoC.

FIG. 3 shows an example physical placement of APPRO-TECT0 and APPROTECT1 in the configuration NVM 19 that may be used in some such embodiments.

When initially opening, and then closing, the debug port 21, the same APPROTECT0 and APPROTECT1 values are written n times, to n words located in different memory rows (i.e. having different y-addresses), for some predetermined value of n>1. The value of n may be set based on a trade-off between security and factors such as circuit complexity, chip area and time. It could equal 2, 4, 8 or any other value.

Furthermore, the APPROTECT0 and APPROTECT1 values are interleaved by being written to alternating columns (32-bit x-address ranges) in successive rows. Thus the first 64-bit word pair has APPROTECT0 in x-address m and APPROTECT1 in x-address m+1, where m is a predetermined value, hardwired into the debug-port control logic 17; the second 64-bit word pair has APPROTECT1 in x-address m and APPROTECT0 in x-address m+1; and so on. This can provide further mitigation against an attack that causes a particular column to be misread consistently over two or more successive read cycles, since this will then necessarily cause a bit error in at least one APPROTECT0 register, as well as in one or more APPROPTECT1 registers, meaning the attack will fail.

In one embodiment, all instances of APPROTECT0 are written to 0xCAACCAAC to open the device at probe testing, while all instances of APPROTECT1 are left unprogrammed as 1's or their initial random values. When using a configuration memory 19 technology that has random values at manufacturing (rather than all 1's, say), there is still a very low probability ($n/2^{32}$) of any individual device 1 being programmable straight after manufacturing because one or more of the APPROTECT1 values randomly happens to equal 0xCAACCAAC.

Once the SoC 1 has been programmed and configured, the debug port 21 can be closed by writing 0xCAACCAAC to all instances of APPROTECT1 and rebooting the SoC 1. To reopen the debug port 21, an attacker must then cause a misread of all n of the APPROTECT1 registers, while not causing even a single bit of any of the n APPROTECT0 registers to be misread. This is evidently extremely difficult to accomplish through known fault-injection attacks. The likelihood of a successful attack can be reduced further by selecting a larger value of n.

Figure 4A:
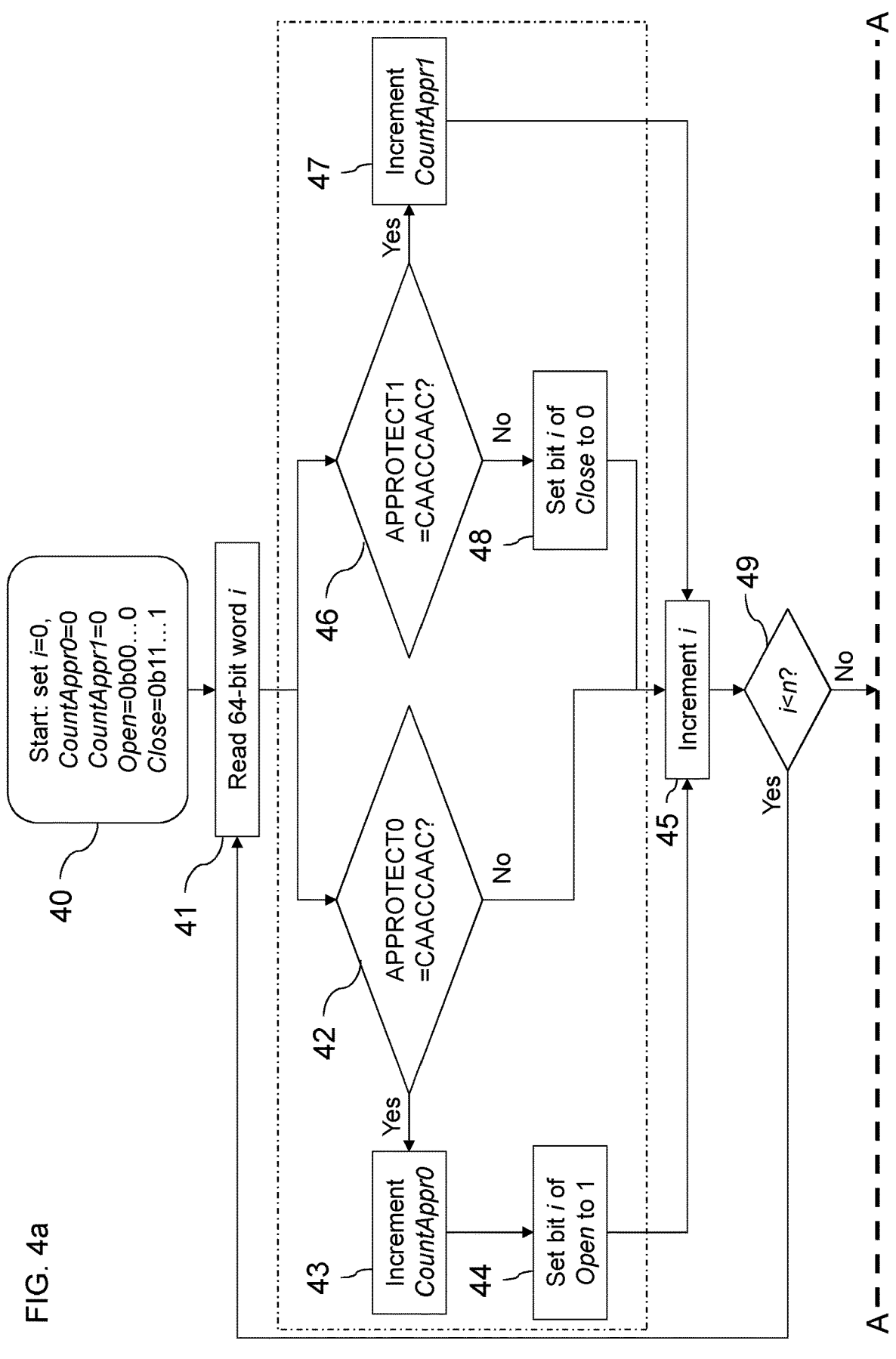
FIG. 4 is a flow chart of operations carried out by port-control logic of the SoC; it is split across two sheets, as FIGS. 4a and 4b, along a cut-line A-A.
Figure 4B:
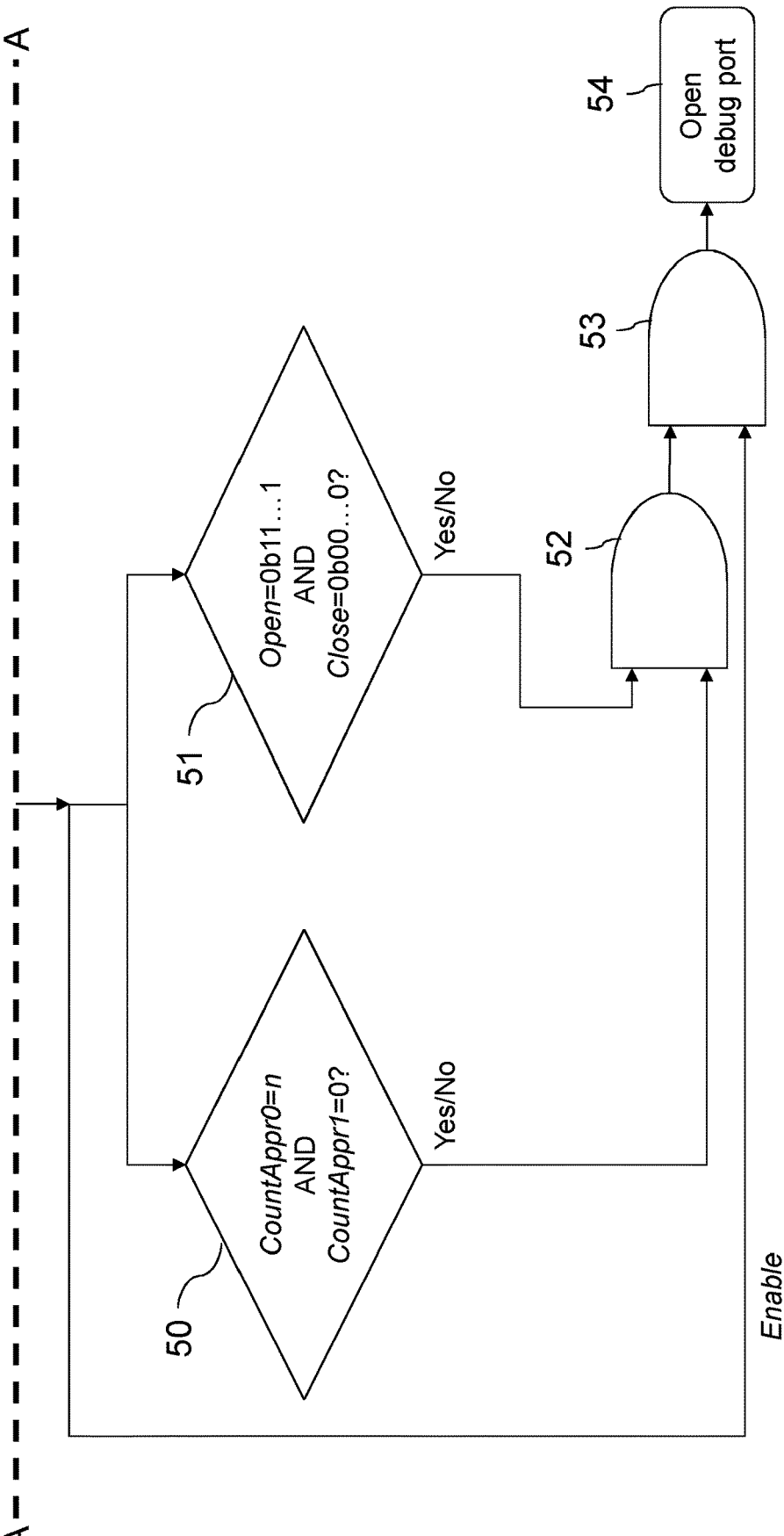

FIG. 4 is a flow chart of an exemplary algorithm, implemented as a finite state machine in the debug-port control logic 17, for securely reading out and evaluating multiple pairs of APPROTECT0 and APPROTECT1 registers.

The SoC 1 starts with the debug port 21 closed, after a reset. The debug-port control logic 17 then reads the APPROTECT values, and evaluates them to determine whether to open the debug port 21 or maintain it in the closed state. The control logic 17 may do this early in the boot process, e.g. even before the processor 9 executes any bootloader code. The state of the debug port 21 (i.e. open or closed) is then maintained until the next system reset.

During the boot process, the debug-port control logic 17 first sets 40 five internal register variables to initial values as follows: i=0, CountAppr0=0, CountAppr1=0, Open=0b00 . . . 0, Close=0b11 . . . 1. The variables Open and Close are each n-bit long bit strings, while the counters i, CountAppr0 and CountAppr1 are sized for counting from zero up to n.

Next, the control logic 17 reads 41 the 64-bit word stored at x-address m & m+1 and y-address i from the configuration NVM 19. It reads this in a single MTP read operation. When the SoC 1 is configured to use the configuration NVM 19 in accordance with FIG. 3, this word represents an instance of the register pair APPROTECT1|APPROTECT0 whenever i is even, and of the pair APPROTECT0|APPROTECT1 whenever i is odd.

In each iteration, the received values for APPROTECT1 and APPROTECT0 are evaluated using a number of steps 42, 43, 44, 46, 47, 48 that are all performed in a single clock cycle. These steps are surrounded by a dashed rectangle in FIG. 4. This is done to minimize the time window in which a fault injection attack might be able to selectively interfere with the evaluation of one of the values and not the other. The received value for APPROTECT0 is checked 42 against the hardcoded value 0xCAACCAAC. If it is equal, CountAppr0 is incremented 43 by one, and the $i^{th}$ bit of the Open bit string is changed 44 from 0 to 1. In parallel with this, the received value for APPROTECT1 is checked 46 against the hardcoded value 0xCAACCAAC. If it is equal, CountAppr1 is incremented 47 by one. If it is not equal, the $i^{th}$ bit of the Close bit string is changed 48 from 1 to 0.

Next, the counter i is checked 49 against the hard-coded number, n, of register pairs. So long as it is still less than n, the process iterates back round to read 41 the next 64-bit register pair from the NVM 19.

In this way, all n register pairs are read before the debug-port control logic 17 performs its logical evaluation of the result, further reducing the change of a fault injection attack interfering with the evaluation process.

Once i reaches n, indicating that all register pair instances have been read, the counters CountAppr0 and CountAppr1 are checked 50 to ensure that CountAppr0=n (indicating that every instance of APPROTECT0 equalled 0xCAACCAAC) and that CountAppr1=0 (indicating that no instance of APPROTECT1 equalled 0xCAACCAAC).

In parallel with this, the bit strings Open and Close are checked 51 to ensure that Open=0b11 . . . 1 (indicating that every instance of APPROTECT0 equalled 0xCAACCAAC) and that Close=0b00 . . . 0 (indicating that no instance of APPROTECT1 equalled 0xCAACCAAC).

The logical results of both checks 50, 51 are combined in a first AND gate 52, the output of which will be high only when both checks are passed. This output is combined, in a second AND gate 53, with an Enable signal which is set high by the while-loop checking step 49 once all n register pairs had been evaluated.

Only when the output of the second AND gate 53 is positive will the debug-port control logic 17 open 54 the debug port 21.

These checks 50, 51 are purely logical, and the debug port 21 opens only when the iterated while-loop have finished (indicating by the Enable signal being high), and all the values in the internal registers are set correctly—i.e. with CountAppr0=n, and
CountAppr1=0, and
Open=all bits at 1, and
Close=all bits at 0.

This ensures that the debug port 21 is only opened when: all APPROTECT0 equal 0xCAACCAAC, and none of the APPROTECT1 equals 0xCAACCAAC.

The redundant use of both the counters CountAppr0, CountAppr1 and the bit fields Open, Close to track the evaluation results at each cycle of the iterative loop further reduces the likelihood of a fault injection attack against the debug-port control logic 17 itself succeeding, since an attacker would need to cause a false positive indication from both mechanisms, in order to trick the control logic 17 into opening the debut port 21, which is less likely than causing just a single mechanism to signal a false positive determination.

Requiring Open to be all 1's, while Close must be all 0's (i.e. the opposite values), in order to open the debug port 21, makes it harder to attack these bit fields successfully using an attack that bias the output of both bit fields in a particular direction (e.g. towards being read as all 1's).

In some variants, the starting value of CountAppr1 may be a predetermined non-zero binary value having an equal number of 1' and 0's, while the starting value of CountAppr0 may be a predetermined non-zero binary value that is n less than a value having an equal number of 1' and 0's, such that both counters should have an equal number of 1's and 0's in their result at the end of the evaluation process if the debug port 21 is to be opened. This can make it more difficult for an attacker to attack these counters, since an attack that sets one or both counters to be mainly or entirely 0's, or mainly or entirely 1's, will fail. Similarly, the starting value of the loop counter i may be a predetermined non-zero binary value that is n less than a value having an equal number of 1' and 0's.

In some variants, for similarly reasons, non-zero target values could be required of Open and Close in order to open the debug port 21—e.g. values that have equal numbers of 1's and 0's, instead of all 1's and all 0's respectively. However, as this would introduce greater complexity in the while-loop of the control circuitry 17, it may not be preferred in all embodiments.

The debug-port control logic 17 is configured to perform the complete algorithm described in FIG. 4, regardless of the outcomes of the evaluations, every time it is run. In particular, it does not terminate early (e.g. by not completing all n iterations) even if a condition is encountered that will necessarily result in the debug port 21 being maintained in its closed state. By ensuring the algorithm has to finish fully before taking the final decision to open the debug 54, or leave it closed, an attacker cannot use supply-current profile analysis to gain an insight into the readout of the APPROTECT settings, in order to mount a fault injection attack.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
a non-volatile memory (NVM);
a debug port; and debug-port control circuitry for controlling access to the integrated-circuit device through the debug port, wherein the debug-port control circuitry is configured to:
read a first bit array and a second bit array from respective predetermined locations in the NVM in a single read cycle, wherein the second bit array is distinct from the first bit array, and wherein at least the second bit array contains a plurality of bits;
determine whether i) the first bit array has a first predetermined bit pattern and ii) the second bit array does not have a second predetermined bit pattern; and
control access through the debug port at least partly in dependence on said determination.

2. The integrated-circuit device of claim 1, wherein the first bit array contains a plurality of bits.

3. The integrated-circuit device of claim 1, wherein the first and second bit arrays have the same length.

4. The integrated-circuit device of claim 1, wherein the first and second bit arrays have a combined bit-length that is equal to a maximum number of bits that the NVM is configured to read in a single read cycle.

5. The integrated-circuit device of claim 1, wherein each predetermined bit pattern contains an equal number of one bits and zero bits.

6. The integrated-circuit device of claim 1, wherein the first and second predetermined bit patterns are a single pattern.

7. The integrated-circuit device of claim 1, wherein the debug-port control circuitry is configured to read the first and second bit arrays and to make said determination in response to the integrated-circuit device being booted and within a boot process of the device.

8. The integrated-circuit device of claim 1, wherein the debug-port control circuitry is configured to open the debug port only when said determination is true and to maintain the debug port closed when the determination is not true.

9. The integrated-circuit device of claim 1, wherein the locations of the first and second bit arrays, and the first and second predetermined bit patterns, are hardwired in the debug-port control circuitry.

10. The integrated-circuit device of claim 1, wherein the debug-port control circuitry is configured to determine, in a single clock cycle, both whether the first bit array has the first predetermined bit pattern and whether the second bit array does not have the second predetermined bit pattern.

11. The integrated-circuit device of claim 1, wherein the debug-port control circuitry is configured to take a predetermined constant number of clock cycles to determine whether to open the debug port, irrespective of what patterns the debug-port control circuitry receives when reading the first and second bit arrays from the NVM.

12. The integrated-circuit device of claim 1, wherein the debug-port control circuitry is configured:
to read a plurality of pairs of first and second bit arrays from respective predetermined locations in the NVM, each pair being read in a respective single read cycle;
for each pair, to determine whether i) the first bit array of the pair has a respective first predetermined bit pattern and ii) the second bit array of the pair does not have a respective second predetermined bit pattern; and
to control access through the debug port at least partly in dependence on the determinations made in respect of each said pair.

13. The integrated-circuit device of claim 12, wherein the respective first and second predetermined patterns are all a single pattern.

14. The integrated-circuit device of claim 12, wherein the debug-port control circuitry is configured to use the same logic, within an iterative process, for determining whether the bit array of each pair has the respective predetermined bit pattern.

15. The integrated-circuit device of claim 12, wherein the debug-port control circuitry is configured to open the debug port only when the first bit array of every pair has the respective first predetermined bit pattern and the second bit array of every pair has a pattern other than the respective second predetermined bit pattern.

16. The integrated-circuit device of claim 12, wherein, for at least two of the pairs of first and second bit arrays, the predetermined locations are such that the first bit array of a first pair is read over a first set of read lines or using a first set of sense amplifiers, the second bit array of the first pair is read over a second set of read lines or using a second set of sense amplifiers, the first bit array of the second pair is read over said second set of read lines or using said second set of sense amplifiers, and the second bit array is read over said first set of read lines or using said first set of sense amplifiers.

17. The integrated-circuit device of claim 12, wherein the debug-port control circuitry is configured to finish reading from the NVM before determining whether to open the debug port.

18. The integrated-circuit device of claim 12, wherein the debug-port control circuitry is configured, for each pair, to determine whether the first bit array of the pair has the respective first bit pattern, and to store a result of said determination in a first counter, before reading the first bit array of a next pair, and to determine whether the second bit array of the pair has the respective second bit pattern, and to store a result of said determination in a second counter, before reading the second bit array of a next pair.

19. The integrated-circuit device of claim 18, wherein the debug-port control circuitry is configured, for each of the first and second counters, to initialize the counter to a respective starting value that is such that a respective final value of the counter, necessary for the debug-port control circuitry to open the debug port, has an equal number of one bits and zero bits.

20. The integrated-circuit device of claim 12, wherein the debug-port control circuitry is configured, for each pair, to determine whether the first bit array of the pair has the respective first bit pattern, and to store a result of said determination by setting a respective bit of a first bit field to a first predetermined value, before reading the first bit array of a next pair, and to determine whether the second bit array of the pair has the respective second bit pattern, and to store a result of said determination by setting a respective bit of a second bit field to a second predetermined value, before reading the second bit array of a next pair, and wherein the second predetermined value is different from the first predetermined value.

* * * * *